US012506980B2

United States Patent
Mikkelsen et al.

(10) Patent No.: US 12,506,980 B2
(45) Date of Patent: Dec. 23, 2025

(54) LOFIC ANTI-LAG METHODS WITH REVERSE BIAS OPTIMIZATION, AND ASSOCIATED SYSTEMS, DEVICES, AND METHODS

(71) Applicant: OMNIVISION TECHNOLOGIES, INC., Santa Clara, CA (US)

(72) Inventors: Sindre Mikkelsen, Ski (NO); Lei Zou, Oslo (NO); Rune Kaald, Kolbotn (NO)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 17 days.

(21) Appl. No.: 18/540,307

(22) Filed: Dec. 14, 2023

(65) Prior Publication Data
US 2025/0203233 A1    Jun. 19, 2025

(51) Int. Cl.
*H04N 25/626* (2023.01)
*H04N 25/59* (2023.01)
*H04N 25/771* (2023.01)

(52) U.S. Cl.
CPC ......... *H04N 25/626* (2023.01); *H04N 25/771* (2023.01); *H04N 25/59* (2023.01)

(58) Field of Classification Search
CPC ........ H04N 25/57; H04N 25/59; H04N 25/62; H04N 25/626; H04N 25/771
See application file for complete search history.

(56) References Cited

U.S. PATENT DOCUMENTS

| 11,343,450 | B1 | 5/2022 | Hasegawa | |
|---|---|---|---|---|
| 11,729,526 | B1 | 8/2023 | Choi | |
| 11,765,484 | B1* | 9/2023 | Choi | H04N 25/77 348/308 |
| 2017/0347047 | A1* | 11/2017 | Mao | H04N 25/59 |
| 2025/0126373 | A1* | 4/2025 | Liu | H04N 25/626 |

OTHER PUBLICATIONS

Ning, et al., "Dielectric relaxation of MIM capacitor and its effect on sigma-delta A/D converters", IEEE Transactions on Semiconductor Manufacturing, vol. 21, Issue: 4, Nov. 2008, pp. 549-564.

* cited by examiner

*Primary Examiner* — Daniel M Pasiewicz
(74) *Attorney, Agent, or Firm* — Dorsey & Whitney LLP

(57) ABSTRACT

Lateral overflow integration capacitor (LOFIC) anti-lag methods with reverse bias optimization (and associated systems, devices, and methods) are disclosed herein. In one embodiment, a method comprises, during a pixel LOFIC idle period for a pixel, applying a reverse bias to a LOFIC of the pixel for a first time period and applying a 0V bias to the LOFIC of the pixel for a second time period. Applying the reverse bias to the LOFIC can include (i) coupling a first metal electrode of the LOFIC to a power source and (ii) coupling a second metal electrode of the LOFIC to a bias voltage source. Applying the 0V bias to the LOFIC can include shorting the first metal electrode and the second metal electrode of the LOFIC to the power source.

20 Claims, 5 Drawing Sheets

LOFIC ANTI-LAG METHODS WITH REVERSE BIAS OPTIMIZATION, AND ASSOCIATED SYSTEMS, DEVICES, AND METHODS

TECHNICAL FIELD

This disclosure relates generally to image sensors. For example, several embodiments of the present technology relate to lateral overflow integration capacitor (LOFIC) anti-lag methods with reverse bias optimization, and associated systems, devices, and methods.

BACKGROUND

Image sensors have become ubiquitous and are now widely used in digital cameras, cellular phones, security cameras, as well as medical, automobile, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to provide information that is representative of the external scene.

BRIEF DESCRIPTION OF THE DRAWINGS

Non-limiting and non-exhaustive embodiments of the present technology are described below with reference to the following figures, in which like or similar reference characters are used to refer to like or similar components throughout unless otherwise specified.

Figure 1:
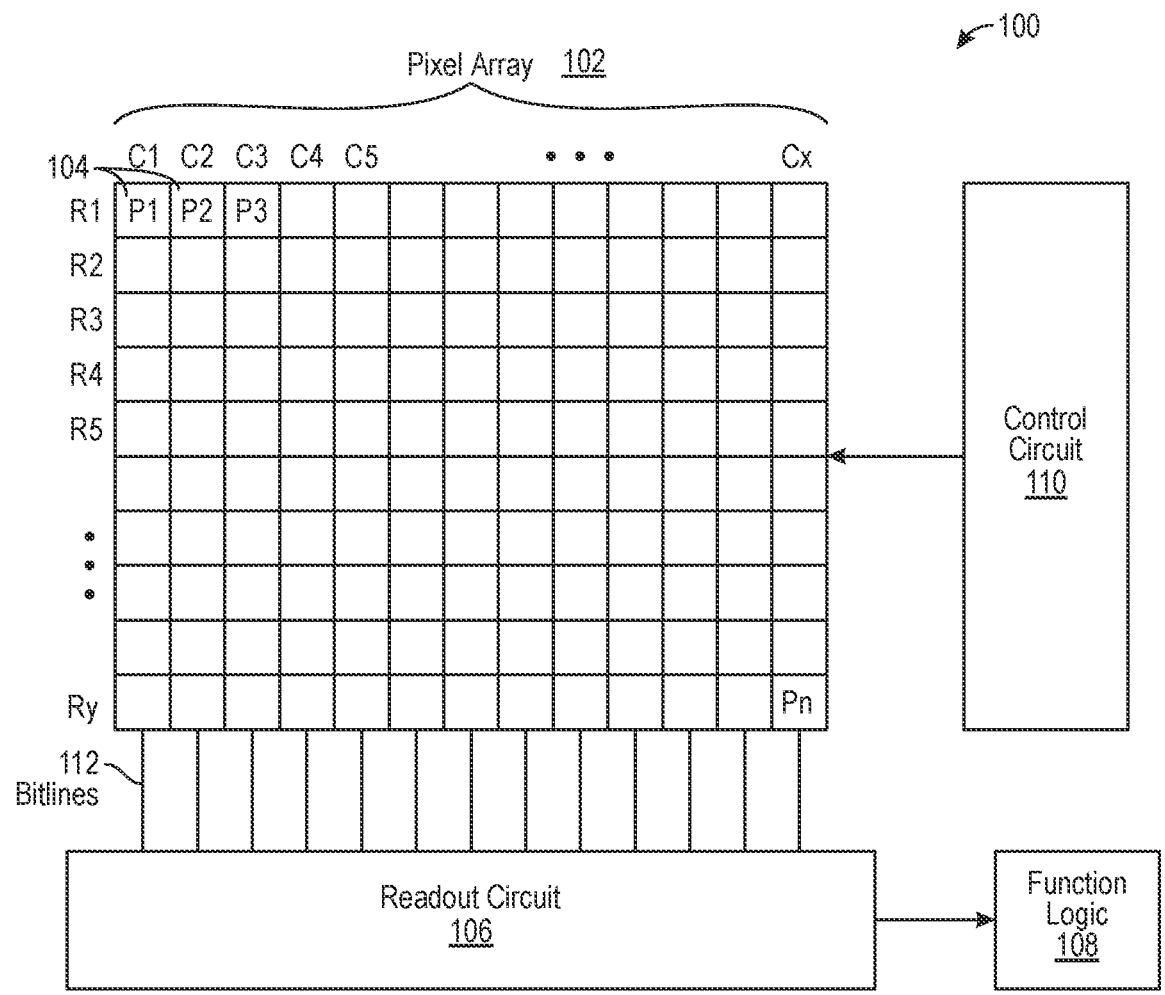
FIG. 1 is a partially schematic block diagram of an imaging system configured in accordance with various embodiments of the present technology.

Skilled artisans will appreciate that elements in the figures are illustrated for simplicity and clarity and are not necessarily drawn to scale. For example, the dimensions of some of the elements in the figures may be exaggerated relative to other elements to aid in understanding of various aspects of the present technology. In addition, common but well-understood elements or methods that are useful or necessary in a commercially feasible embodiment are often not depicted in the figures or described in detail below to avoid unnecessarily obscuring the description of various aspects of the present technology.

DETAILED DESCRIPTION

This disclosure relates generally to image sensors. For example, several embodiments of the present technology relate to lateral overflow integration capacitor (LOFIC) anti-lag methods with reverse bias optimization, and associated systems, devices, and methods. As a specific example, several embodiments of the present technology relate to LOFIC anti-lag methods that apply a reverse or negative bias to a LOFIC during a pixel LOFIC idle period. The reverse bias voltage and/or the amount of time the reverse bias is applied to the LOFIC can be optimized based on one or more factors, such as application and/or fabrication processes.

In the following description, specific details are set forth to provide a thorough understanding of aspects of the present technology. One skilled in the relevant art will recognize, however, that the systems, devices, and techniques described herein can be practiced without one or more of the specific details set forth herein, or with other methods, components, materials, etc.

Reference throughout this specification to an "example" or an "embodiment" means that a particular feature, structure, or characteristic described in connection with the example or embodiment is included in at least one example or embodiment of the present technology. Thus, use of the phrases "for example," "as an example," or "an embodiment" herein are not necessarily all referring to the same example or embodiment and are not necessarily limited to the specific example or embodiment discussed. Furthermore, features, structures, or characteristics of the present technology described herein may be combined in any suitable manner to provide further examples or embodiments of the present technology.

Spatially relative terms (e.g., "beneath," "below," "over," "under," "above," "upper," "top," "bottom," "left," "right," "center," "middle," and the like) may be used herein for ease of description to describe one element's or feature's relationship relative to one or more other elements or features as illustrated in the figures. It will be understood that the spatially relative terms are intended to encompass different orientations of a device or system in use or operation, in addition to the orientation depicted in the figures. For example, if a device or system illustrated in the figures is rotated, turned, or flipped about a horizontal axis, elements or features described as "below" or "beneath" or "under" one or more other elements or features may then be oriented "above" the one or more other elements or features. Thus, the exemplary terms "below" and "under" are non-limiting and can encompass both an orientation of above and below. The device or system may additionally, or alternatively, be otherwise oriented (e.g., rotated ninety degrees about a vertical axis, or at other orientations) than illustrated in the figures, and the spatially relative descriptors used herein are interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

A. Overview

Many pixel circuits incorporate lateral overflow integration capacitors (LOFICs) to increase the full well capacity of the pixel circuits and thereby increase high dynamic range capabilities of corresponding image sensors. LOFIC capacitance is positively correlated with full well capacity. Thus, as the capacitance of a LOFIC employed in a pixel circuit increases, the full well capacity of the pixel circuit also increases. For this reason, higher LOFIC capacitance is commonly desired.

Metal-insulator-metal (MIM) capacitors, and, in particular, three-dimensional (3D) MIM capacitors, are commonly used in image sensors due to their larger capacitance availability per unit area. But MIM capacitors suffer from a known memory effect due to dielectric relaxation, which is a charge trap/charge release phenomenon. More specifically, when a MIM capacitor is employed as a LOFIC in a pixel circuit of an image sensor, charges from a photodiode of the pixel circuit can be transferred to—and become trapped at—the MIM capacitor during a pixel LOFIC read period. Charges trapped at the MIM capacitor typically are discharged from the MIM capacitor at a slow rate, and any residual charge from one frame that remains on the MIM capacitor for the next frame can become an error source in the next frame (e.g., the residual charge can create image artifact or ghosting problems in the next frame). Residual charge present in a current frame but created in a previous frame is known in the art as lag.

A technique to address lag when using MIM capacitors as LOFICS is to short both metal electrodes (e.g., both plates) of the MIM capacitors to a voltage (e.g., a power supply voltage AVDD) during a pixel LOFIC idle period. Shorting both plates of the MIM capacitors to the same voltage can generate an abrupt voltage change across the MIM capacitors, which can discharge or cancel charge trapped on the MIM capacitors. But such a technique is often not sufficient to discharge all of the charge trapped on the MIM capacitors before the beginning of a next frame. Stated another way, when both plates of the MIM capacitors are shorted to the same voltage, the discharge rate of charge trapped on the MIM capacitors can be too slow to adequately discharge all of the trapped charge before the beginning of the next frame. As such, it is not uncommon to have residual charge present on the MIM capacitors at the start of the next frame, even after shorting both plates of the MIM capacitors to the power supply voltage AVDD.

To address this concern, the present technology negatively biases or reverse biases LOFICs during the pixel LOFIC idle period to cancel out charge trapped on the LOFICs. More specifically, the present technology applies a negative bias to the LOFICs during pixel LOFIC idle periods to increase the discharge rate of charge trapped on the LOFICs (and thereby reduce charge trapped on the LOFICs to a dark or zero level) before a beginning of a next frame. The reverse bias can be applied to the LOFICs in addition to or in lieu of shorting both metal electrodes of the LOFICs to a same voltage (referred to herein as applying a 0V bias to the LOFICs). For example, in some embodiments, the present technology can apply a reverse bias to a LOFIC (e.g., by coupling the LOFIC to a bias voltage $V_{CAPLO}$) during a first time period within a pixel LOFIC idle period, and can apply a 0V bias to the LOFIC (e.g., by coupling both metal electrodes of the LOFIC to a power supply voltage AVDD) during a second time period within the pixel LOFIC idle period, the second time period following the first time period. Additionally, or alternatively, the present technology can apply a 0V bias to the LOFIC during a third time period within the pixel LOFIC idle period, the third time period preceding the first time period. In these and still other embodiments, the present technology can sample and hold the bias voltage $V_{CAPLO}$ onto the LOFIC during a fourth time period within the pixel LOFIC idle period to form a high impedance node at a metal electrode of the LOFIC (e.g., to reduce a capacitive load on a biasing buffer that drives the bias voltage $V_{CAPLO}$). The fourth time period can follow the first time period and/or can precede the second time period. As discussed in greater detail below, the bias voltage $V_{CAPLO}$ and/or any one or more of the first through fourth time periods can be configurable (e.g., tunable, adjustable, optimizable) to achieve a desired LOFIC response, such as a discharge rate of charge trapped on the LOFIC and/or a timing window within which charge trapped on the LOFIC is reduced to a dark or zero level before a start of a next frame.

In this manner, the present technology is expected to achieve several advantages over other pixels that incorporate a LOFIC. For example, the present technology is expected to offer better lag reduction and/or image artifact reduction, which can be particularly useful in certain applications (e.g., automobile applications). As another example, the present technology is expected to more quickly discharge or cancel out charge trapped on a LOFIC after a pixel LOFIC readout period, thereby enabling use of shorter pixel LOFIC idle periods and/or use of higher frame rates.

B. Selected Embodiments of LOFIC Anti-Lag Methods with Reverse Bias Optimization, and Associated Systems, Devices, and Methods FIG. 1 is a partially schematic block diagram of an imaging system 100 configured in accordance with various embodiments of the present technology. As shown, the imaging system 100 includes a pixel array 102, readout circuitry 106, function logic 108, and control circuitry 110. The pixel array can be a two-dimensional (2D) array including a plurality of pixel cells or pixel circuits 104 (identified individually in FIG. 1 as pixel P1 through pixel Pn) that are arranged in rows (identified individually in FIG. 1 as row R1 through row Ry) and columns (identified individually in FIG. 1 as column C1 to column Cx). The pixel circuits 104 are each configured to acquire image charge in response to incident light received from an external scene, and to generate a corresponding analog image charge data signal based at least in part on the acquired image charge.

After each pixel circuit 104 has acquired image charge, the corresponding analog image charge data signals are read out of the pixel array 102 along column bitlines 112 and into the readout circuitry 106. In some embodiments, the analog image charge data signals are read out from the pixel array 102 one row of pixel circuits 104 at a time. Alternatively, the analog image charge data signals are read out from the pixel array 102 using other suitable techniques, such as (a) using a serial read out technique to read out the pixel circuits 104 one-by-one in sequence or (b) using a parallel read out technique to read out all or a subset (e.g., multiple rows) of the pixel circuits 104 simultaneously.

When the analog image charge data signals are read into the readout circuitry 106, the analog image charge data signals can be converted into digital values (digital representations) using an analog-to-digital converter (ADC)-not shown. In some embodiments, the ADC of the readout circuitry 106 has adjustable gain such that the analog image charge data signals can be read out of the pixel array 102 with multiple gain settings. Although not shown in FIG. 1, the readout circuitry 106 can additionally, or alternatively, include amplification circuitry, column readout circuitry, and/or other circuitry.

The digital representations of the analog image charge data signals may then be transferred from the readout circuitry 106 to the function logic 108. In some embodiments, the function logic 108 is configured to simply store the digital representations as image data. In other embodiments, the function logic 108 can be configured to manipulate the image data (e.g., by applying post image effects, such as crop, rotate, red eye removal, brightness adjustment, contrast adjustment, etc.) in addition to storing the image data. The image data can be used to render an image of the external scene (e.g., of a person, place, object, etc. within the external scene) from which the light incident on the pixel circuits 104 of the pixel array 102 was received.

As shown, the control circuitry 110 is coupled to the pixel array 102. In some embodiments, the control circuitry 110 controls operational characteristics of the pixel array 102. For example, the control circuitry 110 can generate transfer gate signals and/or other control signals (e.g., reset signals) that are used (a) to control transfer of image charge and/or other signals within each of the pixel circuits 104 and/or (b) to control readout of analog image charge data signals from the pixel array 102. As another example, the control circuitry 110 can generate a shutter signal for controlling image acquisition. The shutter signal can be a global shutter signal for enabling all of the pixel circuits 104 of the pixel array 102 to simultaneously capture respective image charge (and a corresponding analog image charge data signal) during a single acquisition window. Alternatively, the shutter signal can be a rolling shutter signal such that each row, column, or other grouping of pixel circuits 104 is sequentially enabled to capture respective image charge (and corresponding analog image charge data signals) during consecutive acquisition windows. In some embodiments, the shutter signal can establish an exposure time (e.g., defined as a length of time that a shutter remains open, although the imaging system 100 may lack a physical shutter). The exposure time can be the same for each image frame, or the exposure time can vary across different image frames.

Figure 2A:
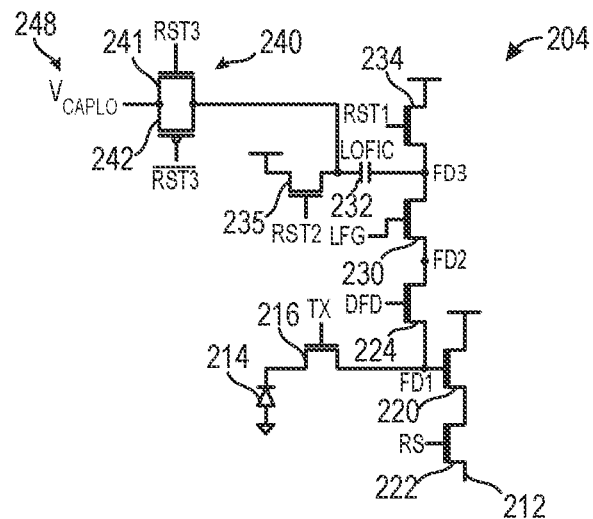
FIG. 2A is a partially schematic diagram of a pixel circuit configured in accordance with various embodiments of the present technology.

FIG. 2A is a partially schematic diagram of a pixel circuit 204 ("the pixel 204") configured in accordance with various embodiments of the present technology. It is appreciated that the pixel 204 of FIG. 2A may be an example of one of the pixel circuits 104 included in the pixel array 102 shown in FIG. 1, or another pixel circuit of the present technology. As shown, the pixel 204 includes a photodiode 214 configured to photogenerate image charge in response to incident light. The pixel 204 further includes a first floating diffusion FD1, and a transfer transistor 216 selectively coupling the photodiode 214 to the first floating diffusion FD1 in response to a transfer control signal TX applied to a gate of the transfer transistor 216. More specifically, when the transfer control signal TX is asserted, the transfer transistor 216 is activated to transfer image charge photogenerated by the photodiode 214, from the photodiode 214 to the first floating diffusion FD1.

The pixel 204 also includes a source follower transistor 220 and a row select transistor 222. The source follower transistor 220 has a gate coupled to the first floating diffusion FD1, and the row select transistor 222 includes a gate configured to receive a row select control signal RS. The row select transistor 222 is coupled to the source follower transistor 220 such that the source follower transistor 220 and the row select transistor 222 are coupled between a power source (e.g., that supplies a power supply voltage AVDD) and a bitline 212. When the row select control signal RS is asserted, the row select transistor 222 is activated to output an image signal from the pixel 204 onto the bitline 212 that is based on an amount of charge at the gate of the source follower transistor 220.

In the illustrated embodiment, the pixel 204 further includes a dual floating diffusion (DFD) transistor 224, a second floating diffusion FD2 (e.g., a capacitor, not shown), a low conversion gain (LFG) transistor 230, a third floating diffusion FD3, a first reset transistor 234, and a lateral overflow integration capacitor (LOFIC) 232. The DFD transistor 224 is coupled between the first floating diffusion FD1 and the second floating diffusion FD2. The second floating diffusion FD2 is coupled to receive excess image charge overflow from the photodiode 214 through the transfer transistor 216 and the DFD transistor 224 when both (i) the transfer control signal TX applied to the gate of the transfer transistor 216 is asserted and (ii) a dual floating diffusion control signal DFD applied to a gate of the DFD transistor 224 is asserted.

The second floating diffusion FD2 is further coupled to a source of the first reset transistor 234 via the LFG transistor 230 and the third floating diffusion FD3. The third floating diffusion FD3 is coupled to receive excess image charge overflow from the photodiode 214 through the transfer transistor 216, the DFD transistor 224, and the LFG transistor 230 when (i) the transfer control signal TX applied to the gate of the transfer transistor 216 is asserted, (ii) the dual floating diffusion control signal DFD applied to the gate of the DFD transistor 224 is asserted, and (iii) a low conversion gain control signal LFG applied to a gate of the LFG transistor 230 is asserted.

The first reset transistor 234 is coupled between the power source (e.g., that supplies the power supply voltage AVDD) and the third floating diffusion FD3. More specifically, in the illustrated embodiment, the first reset transistor 234 is an N-channel transistor having a drain coupled to the power source, and a source coupled to the third floating diffusion FD3, the LFG transistor 230, and a first metal electrode (e.g., a right metal electrode or plate) of the LOFIC 232. In this example configuration, the third floating diffusion FD3, the LFG transistor 230, and the first metal electrode of the LOFIC 232 of the pixel 204 can each be coupled to the power source when a first reset control signal RST1 applied to a gate of the first reset transistor 234 is asserted.

As shown, the pixel 204 also includes a second reset transistor 235. The second reset transistor 235 is coupled between (a) the power source (e.g., that supplies the power supply voltage AVDD) and (b) a second metal electrode (e.g., a left metal electrode or plate) of the LOFIC 232 and a switch 240 (e.g., implemented in a logic die different from a pixel die in which the pixel 204 can be implemented). In this configuration, the switch 240 and the second metal electrode of the LOFIC 232 are coupled to the power source when a second reset control signal RST2 applied to a gate of the second reset transistor 235 is asserted.

In some embodiments, the LOFIC 232 includes a metal-insulator-metal (MIM) capacitor, such as a three-dimensional (3D) MIM capacitor. For example, the LOFIC 232 can be implemented with a MIM capacitor including a high dielectric or high-k insulating material disposed between a first metal electrode and a second metal electrode. In various examples, the insulating material disposed between the first metal electrode and the second metal electrode of the LOFIC 232 may be formed of a single layer of high-k material or a multiple layer stack of high-k material. The exact composition and an overall thickness of high-k material may depend on the desired LOFIC capacitance. In the various examples, high-k material may include one of aluminum oxide (Al2O3), Zirconium dioxide (ZrO2), Hafnium oxide (HfO), or a combination thereof.

In the illustrated embodiment, the switch 240 includes an N-channel transistor 241 coupled in parallel to a P-channel transistor 242. More specifically, a drain of the N-channel transistor 241 is coupled to a source of the P-channel transistor 242, and a source of the N-channel transistor 241 is coupled to a drain of the P-channel transistor 242, to the second metal electrode of the LOFIC 232, and to the second reset transistor 235. A third reset control signal RST3 is supplied to a gate of the N-channel transistor 241, and a complementary third reset control signal $\overline{RST3}$ is supplied to a gate of the P-channel transistor 242. The switch 240 selectively couples the second metal electrode of the LOFIC 232 to a bias voltage source 248 based on the third reset control signal RST3 and on the complementary third reset control signal $\overline{RST3}$. In particular, when the third reset control signal RST3 is asserted (and when the complementary third reset control signal $\overline{RST3}$ is deasserted), the switch 240 couples the second metal electrode of the LOFIC 232 to the bias voltage source 248. In addition, when the third reset control signal RST3 is deasserted (and when the complementary third reset control signal $\overline{RST3}$ is asserted), the switch 240 uncouples the second metal electrode of the LOFIC 232 from the bias voltage source 248. The switch 240 can have other configurations (e.g., just an n-channel transistor or just a p-channel transistor) in other embodiments of the present technology. In operation, the bias voltage source 248 is configured to provide a bias voltage $V_{CAPLO}$ to the second metal electrode of the LOFIC 232 when the switch 240 is activated (e.g., when the third reset control signal RST3 is asserted and the complementary third reset control signal $\overline{RST3}$ is not asserted).

Figure 2B:
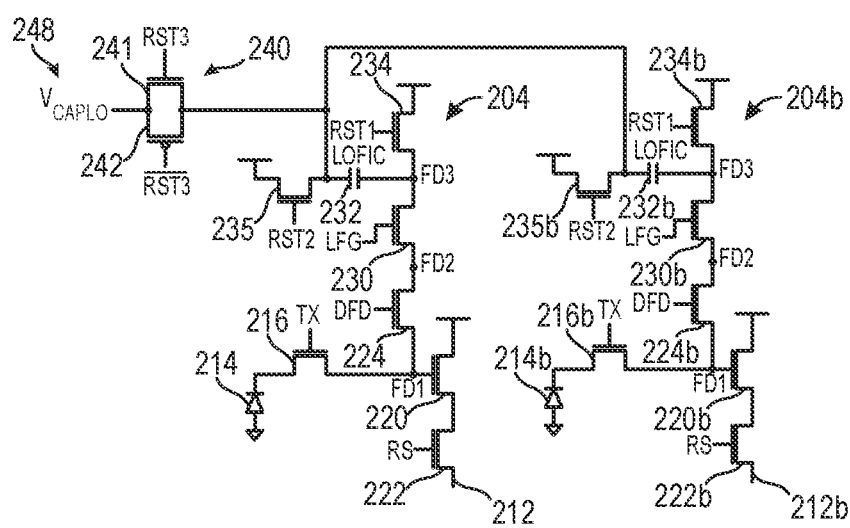
FIG. 2B is a partially schematic diagram of two pixel circuits in a row and configured in accordance with various embodiments of the present technology.

In some embodiments, the switch 240 can selectively couple the bias voltage source 248 to multiple LOFICs in a row of pixels. For example, FIG. 2B illustrates the pixel 204 of FIG. 2A in a row of pixels that also includes a second pixel circuit 204b ("the pixel 204b"). The pixel 204b may be an example of one of the pixel circuits 104 included in the pixel array 102 shown in FIG. 1, or another pixel circuit of the present technology. In the illustrated embodiment, the pixel 204b is identical or at least generally similar to the pixel 204. Thus, similar reference numbers are used across the pixel 204 and the pixel 204b to denote identical or at least generally similar components. As shown in FIG. 2B, the switch 240 selectively couples the bias voltage source 248 to both (i) the second metal electrode (e.g., the left plate) of the LOFIC 232 of the pixel 204 and (ii) a second metal electrode (e.g., the left plate) of a LOFIC 232b of the pixel 204b. More specifically, when the third reset control signal RST3 is asserted (and when the complementary third reset control signal $\overline{RST3}$ is deasserted), the switch 240 couples the second metal electrode of the LOFIC 232 and the second metal electrode of the LOFIC 232b to the bias voltage source 248. In addition, when the third reset control signal RST3 is not asserted (and when the complementary third reset control signal $\overline{RST3}$ is asserted), the switch 240 uncouples the second metal electrode of the LOFIC 232 and the second metal electrode of the LOFIC 232b from the bias voltage source 248. Thus, the bias voltage source 248 is configured to provide a bias voltage $V_{CAPLO}$ to the second metal electrodes of the LOFICs 232 and 232b when the switch 240 is activated (e.g., when the third reset control signal RST3 is asserted and the complementary third reset control signal $\overline{RST3}$ is not asserted).

Figure 3:
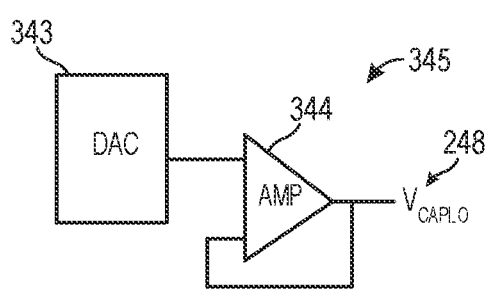
FIG. 3 is a partially schematic diagram of row control circuitry configured in accordance with various embodiments of the present technology.

FIG. 3 is a partially schematic diagram of a row control circuitry 345 configured in accordance with various embodiments of the present technology. It is appreciated that the row control circuitry 345 may be an example of the control circuitry 110 (or a component thereof) shown in FIG. 1, or another control circuit of the present technology. As shown, the row control circuitry 345 includes a digital-to-analog converter 343 ("DAC 343") and an amplifier 344 (e.g., a row driver, a buffer, a biasing buffer). In the illustrated embodiment, an output of the DAC 343 is coupled to a first input of the amplifier 344. A second input of the amplifier 344 is coupled to—and configured to receive feedback from—an output of the amplifier 344. The output of the amplifier 344 is configured as the bias voltage source 248 that is coupled to the switch 240 in FIGS. 2A and 2B. More specifically, the amplifier 344 is configured to output the bias voltage $V_{CAPLO}$ to the pixels 204 and 204b based on the output of the DAC 343. As discussed in greater detail below, the DAC 343 (in combination with or a part of a logic die) can be used to tune, adjust, or optimize the voltage $V_{CAPLO}$ depending on application, fabrication processes, silicon characteristics, and/or other factors.

Figure 4:
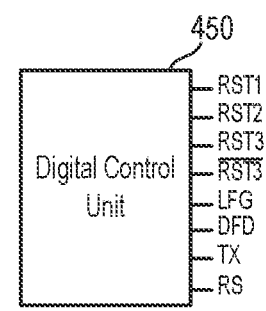
FIG. 4 is a partially schematic diagram of a digital control unit configured in accordance with various embodiments of the present technology.

FIG. 4 is a partially schematic diagram of a digital control unit 450 configured in accordance with various embodiments of the present technology. It is appreciated that the digital control unit 450 may be an example of the control circuitry 110 (or a component thereof) shown in FIG. 1, or another control circuit of the present technology. As shown, the digital control unit 450 includes a plurality of outputs corresponding to various control signals supplied to the pixel 204 of FIGS. 2A and 2B and/or to the pixel 204b of FIG. 2B. For example, the digital control unit 450 is configured to output the transfer control signal TX that is applied to the gate of the transfer transistor 216 of the pixel 204; the row select control signal RS that is applied to the gate of the row select transistor 222 of the pixel 204; the dual floating diffusion control signal DFD that is applied to the gate of the DFD transistor 224 of the pixel 204; and/or the low conversion gain control signal LFG that is applied to the gate of the LFG transistor 230 of the pixel 204. In these and other embodiments, the digital control unit 450 can be configured to output the first reset control signal RST1 that is applied to the gate of the first reset transistor 234 of the pixel 204; the second reset control signal RST2 that is applied to the gate of the second reset transistor 235; the third reset control signal RST3 that is applied to the gate of the N-channel transistor 241 of the switch 240; and/or the complementary third reset control signal $\overline{\text{RST3}}$ that is applied to the gate of the p-channel transistor 242 of the switch 240. One or more of the signals output from the digital control unit 450 can additionally, or alternatively, be applied to the gate(s) of one or more of the corresponding transistors of the pixel 204b. Thus, the digital control unit 450 can output various control signals for controlling the pixel 204 and/or the pixel 204b.

Figure 5:
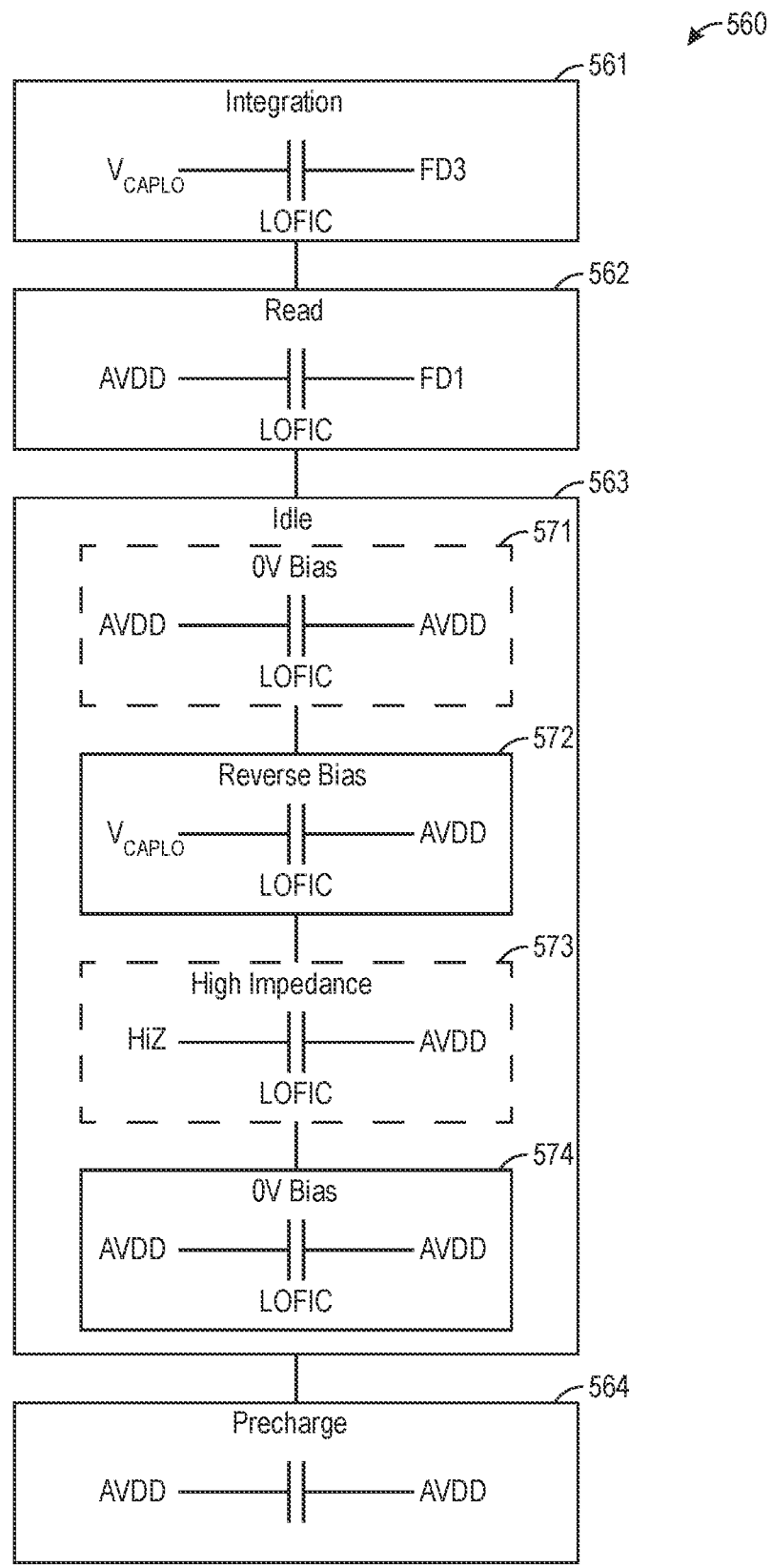
FIG. 5 is a flow diagram illustrating a method of operating a pixel circuit in accordance with various embodiments of the present technology.

FIG. 5 is a flow diagram illustrating a method 560 of operating a pixel in accordance with various embodiments of the present technology. For the sake of example and clarity, the method 560 is described below as a method of operating the pixel 204 of FIGS. 2A and 2B. The method 560 is illustrated as a set of steps or blocks 561-564. All or a subset of one or more of the blocks 561-564 can be executed by various components of an imaging system (e.g., the imaging system 100 of FIG. 1). For example, all or a subset of one or more of the blocks 561-564 can be performed by (a) a pixel array, (b) a pixel, (c) readout circuitry, (d) control circuitry, (e) function logic, (f) row control circuitry (e.g., the row control circuitry 345 of FIG. 3), and/or (g) a digital control unit (e.g., the digital control unit 450 of FIG. 4). Furthermore, all or a subset of one or more of the blocks 561-564 can be executed in accordance with the discussion above.

The method 560 begins at block 561 by performing pixel LOFIC integration. During pixel LOFIC integration, charge corresponding to light incident on the photodiode 214 of the pixel 204 of FIG. 2A can be transferred to—and accumulate on—the LOFIC 232. Referring to FIG. 2A, performing pixel LOFIC integration can include coupling the first metal electrode (e.g., the right metal electrode) of the LOFIC 232 of the pixel 204 to the third floating diffusion FD3 and coupling the second metal electrode (e.g., the left metal electrode) of the LOFIC 232 to the bias voltage source 248. Coupling the second metal electrode of the LOFIC 232 to the bias voltage source 248 can include coupling the second metal electrode to the bias voltage $V_{CAPLO}$. For example, coupling the second metal electrode to the bias voltage source 248 can include activating the switch 240, such as by asserting the third reset control signal RST3 to activate the N-channel transistor 241 and/or deasserting the complementary third reset control signal $\overline{\text{RST3}}$ to active the P-channel transistor 242. Coupling the second metal electrode to the bias voltage source 248 can further include deactivating the second reset transistor 235, such as by deasserting the second reset control signal RST2 (or leaving the second reset control signal RST2 unasserted).

At block 562, the method 560 continues by performing pixel LOFIC readout. During pixel LOFIC readout, signal charge that accumulated on the LOFIC 232 of the pixel 204 during pixel LOFIC integration (performed at block 561 above) can be readout from the pixel 204 (e.g., onto the bitline 212). Referring to FIG. 2A, performing pixel LOFIC readout can include coupling the first metal electrode of the LOFIC 232 (or leaving the first metal electrode of the LOFIC 232 coupled) to the first floating diffusion FD1, and coupling the second metal electrode of the LOFIC 232 to a power source (e.g., that supplies a power supply voltage AVDD). Coupling the first metal electrode of the LOFIC 232 (or leaving the first metal electrode of the LOFIC 232 coupled) to the first floating diffusion FD1 can include asserting (or continuing to assert) the low conversion gain control signal LFG and the dual floating diffusion control signal DFD such that the LFG transistor 230 and the DFD transistor 224 are/remain activated. Coupling the first metal electrode of the LOFIC 232 to the first floating diffusion FD1 at block 562 can further include deactivating the first reset transistor 234 (or leaving the first reset transistor 234 deactivated), such as by deasserting the first reset control signal RST1 (or leaving the first reset control signal RST1 unasserted). In some embodiments, coupling the first metal electrode of the LOFIC 232 to the first floating diffusion FD1 at block 562 can also include asserting the transfer control signal TX (or leaving the transfer control signal TX asserted) to activate the transfer transistor 216 (or leave the transfer transistor 216 activated) and couple the photodiode 214 to the first floating diffusion FD1. Alternatively, coupling the first metal electrode of the LOFIC 232 to the first floating diffusion FD1 at block 562 can include deasserting the transfer control signal TX (or leaving the transfer control signal TX unasserted) to deactivate the transfer transistor 216 (or leave the transfer transistor 216 deactivated).

Coupling the second metal electrode of the LOFIC 232 to the power source can include asserting the second reset control signal RST2 to activate the second reset transistor 235. Additionally, or alternatively, coupling the second metal electrode of the LOFIC 232 to the power source can include deactivating the switch 240 to uncouple the second metal electrode of the LOFIC 232 from the bias voltage source 248. Deactivating the switch 240 can include deasserting the third reset control signal RST3 to deactivate the N-channel transistor 241 and/or asserting the complementary third reset control signal $\overline{\text{RST3}}$ to deactivate the P-channel transistor 242. Deactivating the switch 240 can include deactivating the switch 240 before, while, or after asserting the second reset control signal RST2.

At block 563, the method 560 continues by performing a pixel LOFIC idle period. As discussed above, due to dielectric relaxation in the LOFIC 232, charges from the photodiode 214 can be transferred to—and become trapped at— the LOFIC 232 during the pixel LOFIC read period performed at block 562. Any residual charge from the current frame that remains on the LOFIC 232 in a future frame can become an error source in the future frame (e.g., the residual charge can create image artifact or ghosting problems in the future frame). Thus, the method 560 can include performing one or more subblocks 571-574 during the pixel LOFIC idle period at block 563 to discharge charge trapped on the LOFIC 232 ahead of the start of the future frame.

For example, at subblock 571 of block 563, the method 560 can optionally include shorting both the first and second metal electrodes of the LOFIC 232 to a same voltage (e.g., to the power supply voltage AVDD supplied by the power source). Shorting both the first and second metal electrodes of the LOFIC 232 to the same voltage is referred to herein as applying a 0V bias to the LOFIC 232, and can generate an abrupt voltage change across the LOFIC 232 that discharges at least some of the charge that becomes trapped on the LOFIC after the pixel LOFIC read period performed at block 562 above. In addition, applying a 0V bias to the LOFIC 232 following pixel LOFIC readout and before applying a reverse bias to the LOFIC (as described below with reference to subblock 572) can avoid injection of large current spikes onto the power source supplying the power supply voltage AVDD.

Referring to FIG. 2A, applying a 0V bias to the LOFIC 232 can include asserting the first reset control signal RST1 to activate the first reset transistor 234 and thereby couple the first metal electrode of the LOFIC 232 to the power source (e.g., to the power supply voltage AVDD). In addition, applying the 0V bias to the LOFIC 232 can include asserting the second reset control signal RST2 (or leaving the second reset control signal RST2 asserted) to activate the second reset transistor 235 (or leave the second reset transistor 235 activated) and thereby couple the second metal electrode of the LOFIC 232 to the power source (e.g., to the power supply voltage AVDD). Additionally, or alternatively, applying the 0V bias to the LOFIC 232 can include deactivating the switch 240 (or leaving the switch 240 deactivated), such as by (a) deasserting the third reset control signal RST3 or leaving the third reset control signal RST3 unasserted and/or (b) asserting the complementary third reset control signal $\overline{RST3}$ or leaving the complementary third reset control signal $\overline{RST3}$ asserted.

In some embodiments, the amount of time the 0V bias is applied to the LOFIC 232 at subblock 571 can be configurable. For example, the amount of time (e.g., measured in rowtimes) the 0V bias is applied to the LOFIC 232 can be tunable, adjustable, or optimizable using timing selection (e.g., using the digital control unit 450 of FIG. 4). Additionally, or alternatively, the amount of time the 0V bias is applied to the LOFIC 232 at subblock 571 can be based on one or more factors, such as (a) application, fabrication processes, silicon measurements, etc. of the pixel 204 and/or a corresponding pixel array; (b) a desired amount of time required to discharge charge trapped on the LOFIC 232 to a dark or zero level; and/or (c) a desired discharge accuracy (measured by how near charge trapped on the LOFIC 232 is to the dark or zero level at the end of the 0V bias period of subblock 571, at the end of the reverse bias period described below with reference to subblock 572, at the end of the high impedance period described below with reference to subblock 573, at the end of the pixel LOFIC idle period, or at another timing). In some embodiments, the amount of time the 0V bias is applied to the LOFIC 232 at subblock 571 can be relatively short, such as shorter than an amount of time a reverse bias is applied to the LOFIC 232 at subblock 572 below, at subblock 573 below, and/or in aggregate at subblocks 572 and 573 below. Alternatively, the amount of time the 0V bias is applied to the LOFIC 232 at subblock 571 can be relatively long in comparison to—or the same as—the amount of time a reverse bias is applied to the LOFIC 232 at subblock 572 below, at subblock 573 below, and/or in aggregate at subblocks 572 and 573 below.

In some embodiments, the amount of time the 0V bias is applied to the LOFIC 232 at subblock 571 can be independent of exposure or integration time. Stated another way, the amount of time the 0V bias is applied to the LOFIC 232 at subblock 571 can be constant across multiple different exposure or integration times. Alternatively, the amount of time the 0V bias is applied to the LOFIC 232 at subblock 572 can depend on exposure or integration time. For example, for different exposure or integration times, the pixel 204 and/or a corresponding imaging system can apply a 0V bias to the LOFIC 232 for different amounts of time.

At subblock 572 of block 563, the method 560 can include applying a reverse or negative bias to the LOFIC 232. In comparison to applying a 0V bias to the LOFIC 232, applying a reverse bias to the LOFIC 232 is expected to increase the discharge rate of charge trapped on the LOFIC 232 after the pixel LOFIC read period, such as by generating negative charge trap on the LOFIC 232 to cancel out charge trapped on the LOFIC 232 during the pixel LOFIC read period. Thus, applying the reverse bias to the LOFIC 232 at subblock 572 is expected to more quickly discharge charge trapped on the LOFIC 232 to the dark or zero level than applying a 0V bias to the LOFIC 232, thereby enabling use of shorter frame times and faster frame rates.

Referring to FIG. 2A, applying the reverse bias to the LOFIC 232 can include coupling the first metal electrode of the LOFIC 232 to the power source and coupling the second metal electrode of the LOFIC 232 to the bias voltage source 248. Coupling the first metal electrode of the LOFIC 232 to the power source can include asserting the first reset control signal RST1 (or leaving the first reset control signal RST1 asserted) to activate the first reset transistor 234 (or leave the first reset transistor 234 activated) and thereby couple the first metal electrode of the LOFIC 232 to the power source (e.g., to the power supply voltage AVDD). Coupling the second metal electrode of the LOFIC 232 to the bias voltage source 248 (e.g., to the bias voltage $V_{CAPLO}$) can include activating the switch 240, such as by (a) asserting the third reset control signal $\overline{RST3}$ or leaving the third reset control signal RST3 asserted and/or (b) deasserting the complementary third reset control signal $\overline{RST3}$ or leaving the complementary third reset control signal $\overline{RST3}$ deasserted. In these and other embodiments, coupling the second metal electrode of the LOFIC 232 to the bias voltage source 248 can include deasserting the second reset control signal RST2 or leaving the second reset control signal RST2 unasserted (e.g., to deactivate the second reset transistor 235). The switch 240 can be activated before, while, or after deasserting the second reset control signal RST2.

In some embodiments, the bias voltage $V_{CAPLO}$ and/or the amount of time the reverse bias is applied to the LOFIC 232 at subblock 572 can be configurable. For example, the bias voltage $V_{CAPLO}$ can be tunable, adjustable, or optimizable using the DAC 343 of the row control circuitry 345 of FIG. 3, and the amount of time the reverse bias is applied to the LOFIC 232 at subblock 572 can be tunable, adjustable, or optimizable using timing selection (e.g., using the digital control unit 450 of FIG. 4). The bias voltage $V_{CAPLO}$ and/or the amount of time the reverse bias is applied to the LOFIC 232 at subblock 572 can be based on one or more factors, such as (a) application, fabrication processes, silicon measurements, etc. of the pixel 204 and/or a corresponding pixel array; (b) a desired discharge speed of charge trapped on the LOFIC 232; and/or (c) a desired discharge accuracy (measured by how near charge trapped on the LOFIC 232 is to the dark or zero level at the end of the reverse bias period, at the end of the pixel LOFIC idle period, or at another timing). In some embodiments, the amount of time the reverse bias is applied to the LOFIC 232 at subblock 572 can be relatively long, such as longer than an amount of time a 0V bias is applied to the LOFIC 232 at subblock 571 above, at subblock 574 below, and/or in aggregate at subblocks 571 and 574. Alternatively, the amount of time the reverse bias is applied to the LOFIC 232 at subblock 572 can be relatively short in comparison to—or the same as—the amount of time a 0V bias is applied to the LOFIC 232 at subblock 571 above, at subblock 574 below, and/or in aggregate at subblocks 571 and 574.

In some embodiments, the voltage level of the bias voltage $V_{CAPLO}$ and/or the amount of time the reverse bias is applied to the LOFIC 232 at subblock 572 can be independent of exposure or integration time. Stated another way, the bias voltage $V_{CAPLO}$ and/or the amount of time the reverse bias is applied to the LOFIC 232 at subblock 572 can be constant across multiple different exposure or integration times. Alternatively, the voltage level of the bias voltage $V_{CAPLO}$ and/or the amount of time the reverse bias is applied to the LOFIC 232 at subblock 572 can depend on exposure or integration time. For example, for different exposure or integration times, the pixel 204 and/or a corresponding imaging system can employ different voltage levels for the bias voltage $V_{CAPLO}$ and/or can reverse bias to the LOFIC 232 at subblock 572 for different amounts of time.

After applying the reverse bias to the LOFIC 232 at subblock 572, the method 560 can optionally continue at subblock 573 by forming a high impedance node at the second metal electrode of the LOFIC 232. Forming the high impedance node at the second metal electrode of the LOFIC 232 can include deactivating the switch 240 (e.g., by deasserting the third reset control signal RST3 and/or asserting the complementary third reset control signal $\overline{RST3}$) to uncouple the second metal electrode of the LOFIC 232 from the bias voltage source 248 while the second reset transistor 235 remains deactivated (such that the second metal electrode is also uncoupled from the power source). In some embodiments, the first metal electrode of the LOFIC 232 can remain coupled to the power source (e.g., to the power supply voltage AVDD) by keeping the first reset control signal RST1 asserted and the first reset transistor 234 activated. Forming the high impedance node at the second metal electrode of the LOFIC 232 can sample and hold the bias voltage $V_{CAPLO}$ (supplied by the bias voltage source 248) onto the LOFIC 232. When the bias voltage $V_{CAPLO}$ is a lower voltage level than the power supply voltage AVDD supplied by the power source, discharge of charge trapped on the LOFIC 232 can continue at subblock 573.

In embodiments in which biasing buffers (e.g., the amplifier 344 of FIG. 3) are used to drive the bias voltage $V_{CAPLO}$ to a plurality of pixels of a row or of multiple rows, the capacitive load seen by the biasing buffers can be high at subblock 572 above while applying the reverse bias to the LOFICs of those pixels. The high capacitive load can cause long settling times, presenting a challenge for row time and/or leading to image artifacts. Thus, by sampling and holding the bias voltage $V_{CAPLO}$ onto the LOFIC 232 at subblock 573 and uncoupling the LOFIC 232 from the bias voltage source 248, the capacitive load on the biasing buffers can be decreased, leading to faster settling times and enabling faster frame rates. Uncoupling the LOFIC 232 from the bias voltage source at subblock 573 also makes it easier for the biasing buffers to drive the bias voltage $V_{CAPLO}$, and avoids noise coupling from (i) the LOFIC 232 to (ii) the bias voltage $V_{CAPLO}$ supplied by the bias voltage source or the power supply voltage AVDD supplied by the power source.

In some embodiments, the amount of time the reverse bias is applied to the LOFIC 232 at subblock 573 while the second metal electrode of the LOFIC 232 is a high impedance node can be configurable. For example, the amount of time the reverse bias is applied to the LOFIC 232 at subblock 573 can be tunable, adjustable, or optimizable using timing selection (e.g., using the digital control unit 450 of FIG. 4). The amount of time the reverse bias is applied to the LOFIC 232 at subblock 573 can be based on one or more factors, such as (a) application, fabrication processes, silicon measurements, etc. of the pixel 204 and/or a corresponding pixel array; (b) a desired discharge speed of charge trapped on the LOFIC 232; and/or (c) a desired discharge accuracy (measured by how near charge trapped on the LOFIC 232 is to the dark or zero level at the end of the high impedance period, at the end of the pixel LOFIC idle period, or at another timing). In some embodiments, the amount of time the reverse bias is applied to the LOFIC 232 at subblock 573 (and/or in aggregate at subblocks 572 and 573) can be relatively long, such as longer than an amount of time a 0V bias is applied to the LOFIC 232 at subblock 571 above, at subblock 574 below, and/or in aggregate at subblocks 571 and 574. Alternatively, the amount of time the reverse bias is applied to the LOFIC 232 at subblock 573 (and/or in aggregate at subblocks 572 and 573) can be relatively short in comparison to—or the same as—the amount of time a 0V bias is applied to the LOFIC 232 at subblock 571 above, at subblock 574 below, and/or in aggregate at subblocks 571 and 574.

In some embodiments, the amount of time the reverse bias is applied to the LOFIC 232 at subblock 573 while the second metal electrode of the LOFIC 232 is a high impedance node can be independent of exposure or integration time. Stated another way, the amount of time the reverse bias is applied to the LOFIC 232 at subblock 573 can be constant across multiple different exposure or integration times. Alternatively, the amount of time the reverse bias is applied to the LOFIC 232 at subblock 573 can depend on exposure or integration time. For example, for different exposure or integration times, the pixel 204 and/or a corresponding imaging system can reverse bias to the LOFIC 232 at subblock 573 for different amounts of time.

At subblock 574 of the block 563, the method 560 can continue by applying a 0V bias to the LOFIC 232 (i) after applying a reverse bias to the LOFIC at subblock 572 and/or subblock 573 and (ii) before performing a pixel LOFIC precharge period (as described below with reference to block 564). Applying a 0V bias to the LOFIC 232 at subblock 574, can avoid or lessen a capacitive load on the biasing buffers that drive the bias voltage $V_{CAPLO}$. More specifically, in some embodiments, each LOFIC can have a capacitance on the order of approximately 100 fF. As the biasing buffers can be configured to drive the bias voltage $V_{CAPLO}$ to a plurality (e.g., thousands) of LOFICs, the capacitive load on the biasing buffers can be relatively large. Thus, applying a 0V bias to the LOFIC 232 at subblock 574 can lessen this capacitive load on the biasing buffers ahead of the pixel LOFIC precharge period discussed in greater detail below with reference to block 564.

As discussed above, applying the 0V bias to the LOFIC 232 can include shorting both the first and second metal electrodes of the LOFIC 232 to a same voltage (e.g., to the power supply voltage AVDD supplied by the power source). More specifically, applying a 0V bias to the LOFIC 232 can include asserting the first reset control signal RST1 (or leaving the first reset control signal RST1 asserted) to activate the first reset transistor 234 (or to keep the first reset transistor 234 activated) and thereby couple the first metal electrode of the LOFIC 232 to the power source (e.g., to the power supply voltage AVDD). In addition, applying the 0V bias to the LOFIC 232 can include asserting the second reset control signal RST2 to activate the second reset transistor 235 and thereby couple the second metal electrode of the LOFIC 232 to the power source (e.g., to the power supply voltage AVDD). Additionally, or alternatively, applying the 0V bias to the LOFIC 232 can include deactivating the switch 240 (or leaving the switch 240 deactivated), such as by (a) deasserting the third reset control signal RST3 or leaving the third reset control signal RST3 unasserted and/or (b) asserting the complementary third reset control signal $\overline{RST3}$ or leaving the complementary third reset control signal $\overline{RST3}$ asserted.

In some embodiments, the amount of time the 0V bias is applied to the LOFIC 232 at subblock 574 can be configurable. For example, the amount of time the 0V bias is applied to the LOFIC 232 can be tunable, adjustable, or optimizable using timing selection (e.g., using the digital control unit 450 of FIG. 4). Additionally, or alternatively, the amount of time the 0V bias is applied to the LOFIC 232 at subblock 574 can be based on one or more factors, such as (a) application, fabrication processes, silicon measurements, etc. of the pixel 204 and/or a corresponding pixel array; (b) a desired amount of time required to discharge charge trapped on the LOFIC 232 to the dark or zero level; and/or (c) a desired discharge accuracy (measured by how near charge trapped on the LOFIC 232 is to the dark or zero level at the end of the pixel LOFIC idle period or at another timing). In some embodiments, the amount of time the 0V bias is applied to the LOFIC 232 at subblock 574 (and/or in aggregate at subblocks 571 and 574) can be relatively short, such as shorter than an amount of time a reverse bias is applied to the LOFIC 232 at subblock 572 above, at subblock 573 above, and/or in aggregate at subblocks 572 and 573 above. Alternatively, the amount of time the 0V bias is applied to the LOFIC 232 at subblock 574 (and/or in aggregate at subblocks 571 and 574) can be relatively long in comparison to—or the same as—the amount of time a reverse bias is applied to the LOFIC 232 at subblock 572 above, at subblock 573 above, and/or in aggregate at subblocks 572 and 573 above.

In some embodiments, the amount of time the 0V bias is applied to the LOFIC 232 at subblock 574 (and/or in aggregate at subblocks 571 and 574) can be independent of exposure or integration time. Stated another way, the amount of time the 0V bias is applied to the LOFIC 232 at subblock 574 (and/or in aggregate at subblocks 571 and 574) can be constant across multiple different exposure or integration times. Alternatively, the amount of time the 0V bias is applied to the LOFIC 232 at subblock 574 (and/or in aggregate at subblocks 571 and 574) can depend on exposure or integration time. For example, for different exposure or integration times, the pixel 204 and/or a corresponding imaging system can apply a 0V bias to the LOFIC 232 at subblock 574 (and/or in aggregate at subblocks 571 and 574) for different amounts of time.

At block 564, the method 560 continues by performing pixel LOFIC precharge. During pixel LOFIC precharge, both the first and second metal electrodes of the LOFIC 232 can be shorted (or remain shorted) to a same voltage (e.g., to the power supply voltage A VDD supplied by the power source). For example, the first reset control signal RST1 can be asserted (or left asserted) to activate the first reset transistor 234 (or to keep the first reset transistor 234 activated) and thereby couple the first metal electrode of the LOFIC 232 to the power source (e.g., to the power supply voltage AVDD). In addition, the second reset control signal RST2 can be asserted (or left asserted) to activate the second reset transistor 235 (or to keep the second reset transistor 235 activated) and thereby couple the second metal electrode of the LOFIC 232 to the power source (e.g., to the power supply voltage AVDD). Additionally, or alternatively, the switch 240 can be deactivated (or left deactivated), such as by (a) deasserting the third reset control signal RST3 or leaving the third reset control signal RST3 unasserted and/or (b) asserting the complementary third reset control signal $\overline{RST3}$ or leaving the complementary third reset control signal $\overline{RST3}$ asserted. In these and other embodiments, the transfer control signal TX can be asserted or deasserted to activate or deactivate, respectively, the transfer transistor 216; the dual floating diffusion control signal DFD can be asserted or deasserted to activate or deactivate, respectively, the DFD transistor 224; and/or the low conversion gain control signal LFG can be asserted or deasserted to activate or deactivate, respectively, the LFG transistor 230.

Although the steps 561-564 of the method 560 are discussed and illustrated in a particular order, the method 560 of FIG. 5 is not so limited. In other embodiments, the steps 561-564 and/or the subblocks 571-574 of the method 560 can be performed in a different order. In these and other embodiments, any of the steps 561-564 and/or any of the subblocks 571-574 of the method 560 can be performed before, during, and/or after any of the other steps 561-564 and/or any of the subblocks 571-574 of the method 560. Furthermore, a person skilled in the art will readily recognize that the method 560 can be altered and still remain within these and other embodiments of the present technology. For example, one or more steps 561-564 and/or one or more of the subblocks 571-574 of the method 560 can be omitted and/or repeated in some embodiments.

Figure 6:
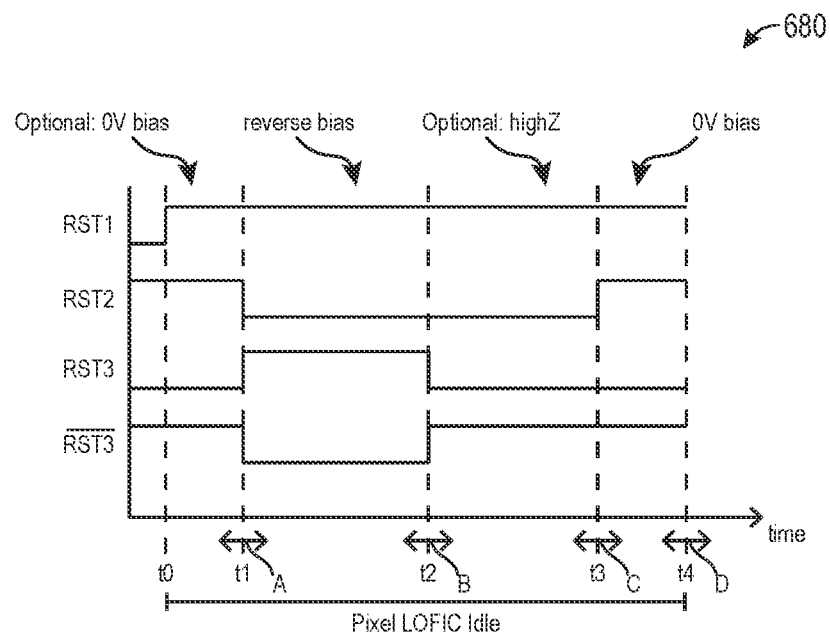
FIG. 6 is an example timing diagram illustrating a method of operating a pixel circuit during a pixel LOFIC idle period in accordance with various embodiments of the present technology.

FIG. 6 is an example timing diagram 680 illustrating a method of operating a pixel circuit during a pixel LOFIC idle period in accordance with various embodiments of the present technology. For the sake of clarity and example, the timing diagram 680 is discussed in detail below with reference to the pixel 204 of FIG. 2A. Referring to FIGS. 2A and 6 together, the pixel LOFIC idle period can optionally begin at time t0 by applying a 0V bias to the LOFIC 232 of the pixel 204. This can include asserting the first reset control signal RST1 such that the first metal electrode of the LOFIC 232 is coupled to the power source (e.g., to the power supply voltage AVDD) via the first reset transistor 234. As shown in FIG. 6, the first reset control signal RST1 can remain asserted for the duration of the pixel LOFIC idle period. Furthermore, applying the 0V bias to the LOFIC 232 at time t0 can include asserting the second reset control signal RST2 (or leaving the second reset control signal RST2 asserted) such that the second metal electrode of the LOFIC 232 (i) is coupled to the power source via the second reset transistor 235 and (ii) is shorted to the first metal electrode of the LOFIC 232. In addition, applying the 0V bias to the LOFIC 232 at time t0 can include deasserting the third reset control signal RST3 (or leaving the third reset control signal RST3 unasserted) and asserting the complementary third reset control signal $\overline{RST3}$ (or leaving the complementary third reset control signal $\overline{RST3}$ unasserted), such that (i) the N-channel transistor 241 and the P-channel transistor 242, respectively, of the switch 240 are/remain deactivated and (ii) the second metal electrode of the LOFIC 232 is uncoupled from the bias voltage source 248.

The pixel LOFIC idle period can continue (or alternatively begin) at time t1 by applying a reverse bias to the LOFIC 232 of the pixel 204. Applying the reverse bias to the LOFIC 232 can include asserting the first reset control signal RST1 or leaving the first reset control signal RST1 asserted. In addition, applying the reverse bias to the LOFIC 232 at time t1 can include (i) deasserting the second reset control signal RST2 to deactivate the second reset transistor 235 and thereby uncouple the second metal electrode of the LOFIC 232 from the power source; and (ii) activate the switch 240 to couple the second metal electrode of the LOFIC 232 to the bias voltage source 248 by asserting the third reset control signal RST3 and deasserting the complementary third reset control signal $\overline{RST3}$.

The pixel LOFIC idle period can optionally continue at time t2 by sampling and holding the bias voltage $V_{CAPLO}$ onto the LOFIC 232 and forming a high impedance node at the second metal electrode of the LOFIC 232. Forming the high impedance node can include deactivating the switch 240 to uncouple the second metal electrode of the LOFIC 232 from the bias voltage source 248 by deasserting the third reset control signal RST3 and asserting the complementary third reset control signal $\overline{RST3}$. Additionally, or alternatively, forming the high impedance node can include leaving the second reset control signal RST2 unasserted such that the second reset transistor 235 remains deactivated and the second metal electrode of the LOFIC remains uncoupled from the power source. During the high impedance period, the first reset control signal RST1 can be left asserted such that the first metal electrode of the LOFIC 232 remains coupled to the power source via the first reset transistor 234.

At time t3, the pixel LOFIC idle period can continue by applying a 0V bias to the LOFIC 232. Similar to above, this can include asserting the first reset control signal RST1 (or leaving the first reset control signal RST1 asserted) such that the first metal electrode of the LOFIC 232 is coupled to the power source (e.g., to the power supply voltage AVDD) via the first reset transistor 234. Furthermore, applying the 0V bias to the LOFIC 232 at time t3 can include asserting the second reset control signal RST2 such that the second metal electrode of the LOFIC 232 (i) is coupled to the power source via the second reset transistor 235 and (ii) is shorted to the first metal electrode of the LOFIC 232. In addition, applying the 0V bias to the LOFIC 232 at time t3 can include deasserting the third reset control signal RST3 (or leaving the third reset control signal RST3 unasserted) and asserting the complementary third reset control signal $\overline{RST3}$ (or leaving the complementary third reset control signal $\overline{RST3}$ unasserted), such that (i) the N-channel transistor 241 and the P-channel transistor 242, respectively, of the switch 240 are/remain deactivated and (ii) the second metal electrode of the LOFIC 232 is uncoupled from the bias voltage source 248. At time t4, the pixel LOFIC idle period can end at a beginning of a pixel LOFIC precharge period.

In FIG. 6, an arrow A is shown about time t1 to indicate (a) that a duration of the 0V bias period between time t0 and time t1 and/or (b) a start of the reverse bias period, is/are configurable in accordance with the discussion of FIG. 5 above. In addition, an arrow B is shown about time t2 to indicate (a) that a duration of the reverse bias period between time t1 and time t2 and/or (b) a start of the high impedance period, is/are configurable in accordance with the discussion of FIG. 5 above. Furthermore, an arrow C is shown about time t3 to indicate (a) that a duration of the high impedance period between time t2 and time t3 and/or (b) a start of the 0V bias period, is/are configurable in accordance with the discussion of FIG. 5 above. Additionally, an arrow D is shown about time t4 to indicate (a) that a duration of the 0V bias period between time t3 and time t4, (b) an end of the pixel LOFIC idle period, and/or (c) a duration of the pixel LOFIC idle period, is/are configurable in accordance with the discussion of FIG. 5 above.

Moreover, in the illustrated example, the duration of the 0V bias period between time t0 and time t1, the duration of the 0V bias period between time t3 and time t4, and the aggregate of these durations are shown as being less than the duration of the reverse bias period between time t1 and time t2, the duration of the high impedance period between time t2 and time 3, and the aggregate of the reverse bias and high impedance durations. Any one or more of these durations is configurable in accordance with the discussion of FIG. 5 above. Thus, the length of any one of these durations can differ from (e.g., be longer or short than)—or be the same as—the length of any one or more of the other ones of these durations in other embodiments of the present technology.

Figure 7:
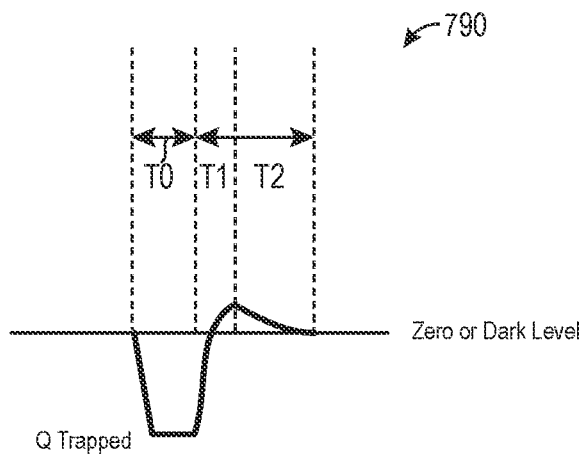
FIG. 7 is a line plot illustrating charge on a LOFIC over time in accordance with various embodiments of the present technology.

FIG. 7 is a line plot 790 illustrating charge trapped on a LOFIC over time in accordance with various embodiments of the present technology. As shown, during a time period T0 corresponding to a pixel LOFIC integration period and a pixel LOFIC readout period, signal accumulates on a LOFIC and generates trapped charge on the LOFIC. During a time period T1 that corresponds to a first portion of a pixel LOFIC idle period during which a reverse bias is applied to the LOFIC consistent with the discussion above, charge trapped on the LOFIC is rapidly discharged or canceled out. The discharge rate of the trapped charge can depend on the voltage level of the bias voltage $V_{CAPLO}$ and/or on an amount of time the reverse bias is applied to the LOFIC. As shown, application of a reverse bias to the LOFIC accelerates discharge of charge trapped on the LOFIC and (in some cases) can overshoot a dark or zero level. It is expected that a desired amount of overshoot can be achieved by tuning, adjusting, or optimizing the voltage level of the bias voltage $V_{CAPLO}$ and/or the amount of time the reverse bias is applied to the LOFIC.

The time period T2 shown in the line plot 790 corresponds to a second portion of a pixel LOFIC idle period during which a 0V bias is applied to the LOFIC consistent with the discussion above. During the time period T2, charge trapped on the LOFIC (or, in the illustrated example, negative charge trapped on the LOFIC) is discharged or canceled to drop charge trapped on the LOFIC toward the dark or zero level. The discharge rate of the trapped charge when a 0V bias is applied to the LOFIC is expected to be slower than the discharge rate of the trapped charge when a reverse bias is applied to the LOFIC.

In the illustrated example, the period of time T1 that the reverse bias is applied to the LOFIC during the pixel LOFIC idle period is shorter than the period of time T2 that the 0V bias is applied to the LOFIC. As discussed above, the period of time T1 and/or the period of time T2 can be configurable (e.g., tuned, adjusted, set, optimized). Thus, the period of time T1 can be longer than—or equivalent to—the period of time T2 in other embodiments of the present technology. In many applications, the period of time T1 and/or the period of time T2 can be configured such that charge trapped on the LOFIC by the end of the pixel LOFIC idle period (e.g., by the end of the period T2) is at or near the dark or zero level.

Figure 8:
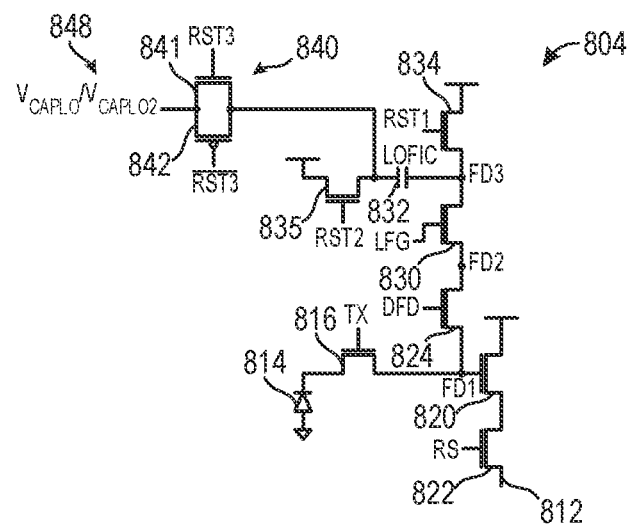
FIG. 8 is a partially schematic diagram of another pixel circuit configured in accordance with various embodiments of the present technology.

FIG. 8 is a partially schematic diagram of another pixel circuit 804 ("the pixel 804") configured in accordance with various embodiments of the present technology. It is appreciated that the pixel 804 of FIG. 8 may be an example of one of the pixel circuits 104 included in the pixel array 102 shown in FIG. 1, or another pixel circuit of the present technology. As shown, the pixel 804 is identical or at least generally similar to the pixel 204 of FIG. 2A. Thus, similar reference numbers are used across FIGS. 2A and 8 to denote identical or at least generally similar components. The pixel 804 differs from the pixel 204, however, in that the pixel 804 is configured to receive multiple bias voltages (e.g., $V_{CAPLO}$ and $V_{CAPLO2}$) from the bias voltage source 848. As discussed above, the bias voltage $V_{CAPLO}$ can be tuned, adjusted, or optimized based on one or more factors. The bias voltage $V_{CAPLO2}$ may also be tunable, adjustable, or optimizable based on one or more factors, or may be invariable. In these and other embodiments, the bias voltage $V_{CAPLO}$ can be a same voltage level as—or a different voltage level from—the bias voltage $V_{CAPLO2}$.

In some embodiments, the bias voltage $V_{CAPLO2}$ can be a buffered voltage output that is used (e.g., only) during pixel LOFIC integration. For example, the bias voltage $V_{CAPLO2}$ can be used to set a dynamic range of the LOFIC signal. By contrast, the bias voltage $V_{CAPLO}$ can be used (e.g., only) during the pixel LOFIC idle period consistent with the discussion of FIGS. 5 and 6 above. Thus, the bias voltage $V_{CAPLO}$ can be freely tunable (e.g., without affecting the bias voltage $V_{CAPLO2}$ and/or without affecting pixel LOFIC integration) to optimize the best reverse bias and/or high impedance response of the LOFIC 232 for discharging charge that becomes trapped on the LOFIC 232 during the pixel LOFIC readout period.

Figure 9:
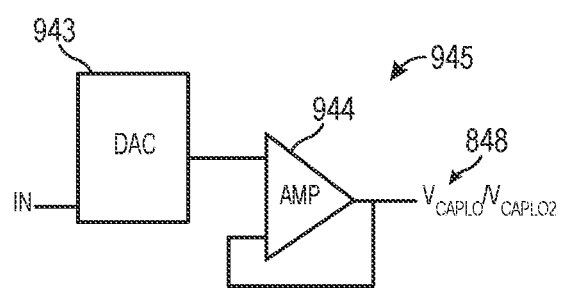
FIG. 9 is a partially schematic diagram of another a row control circuitry configured in accordance with various embodiments of the present technology.

FIG. 9 is a partially schematic diagram of another row control circuitry 945 configured in accordance with various embodiments of the present technology. It is appreciated that the row control circuitry 945 may be an example of the control circuitry 110 (or a component thereof) shown in FIG. 1, or another control circuit of the present technology. As shown, the row control circuitry 945 is generally similar to the row control circuitry 345 of FIG. 3. Thus, similar references numbers are used across FIGS. 3 and 9 to denote identical or at least generally similar components. The DAC 943 of the of the row control circuitry 945, however, differs from the DAC 343 in that it includes an input configured to receive a control signal IN. The control signal IN can be used to control whether the DAC 943 outputs the bias voltage $V_{CAPLO}$ or the bias voltage $V_{CAPLO2}$ to the pixel 804 of FIG. 8. For example, when the control signal IN is in a first state (e.g., during the pixel LOFIC integration period), the DAC 943 can be configured to output the bias voltage $V_{CAPLO2}$. Additionally, or alternatively, when the control signal IN is in the second state (e.g., during the pixel LOFIC idle period), the DAC 943 can be configured to output the bias voltage $V_{CAPLO}$. As discussed above, the DAC 943 (e.g., in combination with or as part of a logic die) can be used to tune, adjust, or optimize the bias voltage $V_{CAPLO}$ and/or the bias voltage $V_{CAPLO2}$, such as depending on application, fabrication processes, silicon characteristics, and/or other factors. In some embodiments, $V_{CAPLO}$ can be less than or equal to $V_{CAPLO2}$. As a specific example, $V_{CAPLO}$ can be greater than 0V but less than or equal to $V_{CAPLO2}$.

Figure 10:
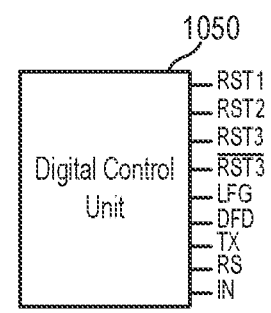
FIG. 10 is a partially schematic diagram of another digital control unit configured in accordance with various embodiments of the present technology.

FIG. 10 is a partially schematic diagram of another digital control unit 1050 configured in accordance with various embodiments of the present technology. It is appreciated that the digital control unit 1050 may be an example of the control circuitry 110 (or a component thereof) shown in FIG. 1, or another control circuit of the present technology. As shown, the digital control unit 1050 is generally similar to the digital control unit 450 of FIG. 4. Thus, similar references numbers are used across FIGS. 4 and 10 to denote identical or at least generally similar components. The digital control unit 1050 of FIG. 10, however, includes an additional output in comparison to the digital control unit 450 of FIG. 4. More specifically, the digital control unit 1050 is configured to output the control signal IN that is input into the DAC 943 of the row control circuitry 945 of FIG. 9 to control whether the DAC 943 outputs the bias voltage $V_{CAPLO}$ or the bias voltage $V_{CAPLO2}$. For example, the digital control unit 1050 can output the control signal IN in a first state during a pixel LOFIC integration period, and can output the control signal IN in a second state during a pixel LOFIC idle period.

C. Conclusion

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order above, alternative embodiments may perform steps in a different order. Furthermore, the various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where context permits, singular or plural terms may also include the plural or singular term, respectively. In addition, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded. Moreover, as used herein, the phrases "based on," "depends on," "as a result of," and "in response to" shall not be construed as a reference to a closed set of conditions. For example, an exemplary step that is described as "based on condition A" may be based on both condition A and condition B without departing from the scope of the present disclosure. In other words, as used herein, the phrase "based on" shall be construed in the same manner as the phrase "based at least in part on" or the phrase "based at least partially on." Also, the terms "connect" and "couple" are used interchangeably herein and refer to both direct and indirect connections or couplings. For example, where the context permits, element A "connected" or "coupled" to element B can refer (i) to A directly "connected" or directly "coupled" to B and/or (ii) to A indirectly "connected" or indirectly "coupled" to B.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. A method, comprising:
   during a pixel lateral overflow integration capacitor (LOFIC) idle period for a pixel—
   applying a reverse bias to a LOFIC of the pixel for a first time period, wherein applying the reverse bias to the LOFIC includes coupling a first metal electrode of the LOFIC to a power source and coupling a second metal electrode of the LOFIC to a bias voltage source, wherein a voltage level of a bias voltage provided by the bias voltage source is less than a voltage level of a power supply voltage supplied by the power source; and applying a 0V bias to the LOFIC of the pixel for a second time period, wherein applying the 0V bias to the LOFIC includes shorting the first metal electrode and the second metal electrode of the LOFIC to the power source.

2. The method of claim 1, wherein the second time period occurs after the first time period within the pixel LOFIC idle period such that the 0V bias is applied to the LOFIC after the reverse bias is applied to the LOFIC.

3. The method of claim 1, wherein the second time period occurs before the first time period within the pixel LOFIC idle period such that the 0V bias is applied to the LOFIC before the reverse bias is applied to the LOFIC.

4. The method of claim 3, further comprising, during the pixel LOFIC idle period, applying the 0V bias to the LOFIC of the pixel for a third time period, wherein the third time period occurs after the first time period within the pixel LOFIC idle period such that the 0V bias is applied to the LOFIC after the reverse bias is applied to the LOFIC.

5. The method of claim 1, wherein a duration of the first time period is longer than a duration of the second time period.

6. The method of claim 1, wherein a duration of the first time period is shorter than a duration of the second time period.

7. The method of claim 1, further comprising adjusting the bias voltage provided by the bias voltage source based at least in part on application of the pixel, silicon measurements corresponding to the pixel or an image sensor including the pixel, a desired discharge rate of charge trapped on the LOFIC, or any combination thereof.

8. The method of claim 1, further comprising adjusting a duration of the first time period based at least in part on application of the pixel, silicon measurements corresponding to the pixel or an image sensor including the pixel, a desired discharge accuracy, or any combination thereof.

9. The method of claim 1, further comprising adjusting a duration of the first time period based at least in part on a duration of a pixel integration period.

10. The method of claim 1, further comprising adjusting a duration of the second time period based at least in part on application of the pixel, silicon measurements corresponding to the pixel or an image sensor including the pixel, a desired discharge accuracy, en a duration of a pixel integration period, or any combination thereof.

11. The method of claim 1, wherein:
the pixel LOFIC idle period is a first pixel LOFIC idle period of a first frame;
the first frame includes a pixel integration period having a first duration;
a second frame includes (i) a second pixel LOFIC idle period and (ii) a pixel integration period having a second duration different from the first duration; and
the method further comprises:
during the second pixel LOFIC idle period of the second frame
applying the reverse bias to the LOFIC of the pixel for the first time period; and
applying the 0V bias to the LOFIC for the second time period.

12. The method of claim 1, further comprising, after applying the reverse bias to the LOFIC, sampling and holding the bias voltage on the LOFIC for a third time period, wherein sampling and holding the bias voltage on the LOFIC includes uncoupling the LOFIC from the bias voltage source and forming a high impedance node at the second metal electrode of the LOFIC.

13. The method of claim 12, further comprising adjusting a duration of the third time period based at least in part on application of the pixel, silicon measurements corresponding to the pixel or an image sensor including the pixel, a desired discharge accuracy, or any combination thereof.

14. The method of claim 1, wherein:
the pixel LOFIC idle period is a pixel LOFIC idle period of a frame;
the bias voltage is a first bias voltage; and
the method further comprises coupling the second metal electrode of the LOFIC to a second bias voltage different from the first bias voltage during a pixel LOFIC integration period of the frame.

15. An image sensor, comprising:
a pixel circuit, including—
a photodiode configured to photogenerate signal charge based on incident light,
a floating diffusion configured to receive the signal charge from the photodiode,
a lateral overflow integration capacitor (LOFIC) having (i) a first metal electrode selectively coupled to the floating diffusion and (ii) a second metal electrode,
a first reset transistor configured to selectively couple (a) the first metal electrode of the LOFIC and the floating diffusion to (b) a power source, based at least in part on a first reset control signal applied to a gate of the first reset transistor, and
a second reset transistor configured to selectively couple the second metal electrode of the LOFIC to the power source based at least in part on a second reset control signal applied to a gate of the second reset transistor; and
a switch configured to selectively couple the second metal electrode of the LOFIC to a bias voltage source, wherein a voltage level of a bias voltage provided by the bias voltage source is less than a voltage level of a power supply voltage supplied by the power source,
wherein the image sensor is configured, during a pixel LOFIC idle period of a frame, to:
apply a reverse bias to the LOFIC of the pixel for a first time period, and applying a 0V bias to the LOFIC of the pixel for a second time period.

16. The image sensor of claim 15, wherein:
to apply the reverse bias to the LOFIC, the image sensor is configured to (a) assert the first reset control signal to couple the first metal electrode of the LOFIC to the power source via the first reset transistor and (b) activate the switch to couple the second metal electrode of the LOFIC to the bias voltage source; and
to apply the 0V bias to the LOFIC, the image sensor is configured to (a) assert the first reset control signal to couple the first metal electrode of the LOFIC to the power source via the first reset transistor and (b) assert the second reset control signal to couple the second metal electrode of the LOFIC to the power source via the second reset transistor.

17. The image sensor of claim 16, wherein:

the second time period occurs after the first time period;

the image sensor is further configured, during the pixel LOFIC idle period of the frame, to apply a 0V bias to the LOFIC of the pixel for a third time period;

to apply the 0V bias to the LOFIC for the third time period, the image sensor is configured to (a) assert the first reset control signal to couple the first metal electrode of the LOFIC to the power source via the first reset transistor and (b) assert the second reset control signal to couple the second metal electrode of the LOFIC to the power source via the second reset transistor; and the third time period occurs before the first time period within the pixel LOFIC idle period.

18. The image sensor of claim 16, wherein:

the image sensor is further configured, during the pixel LOFIC idle period of the frame, to sample and hold the bias voltage on the LOFIC for a third time period;

the third time period occurs after the first time period; and to sample and hold the bias voltage on the LOFIC, the image sensor is configured to form a high impedance node at the second metal electrode of the LOFIC by deactivating the switch while (a) the second metal electrode of the LOFIC is coupled to the bias voltage source and (b) the second reset control signal is not asserted such that the second reset transistor is deactivated and the second metal electrode is uncoupled from the power source.

19. The image sensor of claim 16, wherein:

the bias voltage is a first bias voltage; and the image sensor is further configured, during a pixel LOFIC integration period of the frame, to couple the second metal electrode of the LOFIC to a second bias voltage different from the first bias voltage and from the power supply voltage.

20. The image sensor of claim 15, wherein:

the pixel circuit is a first pixel circuit;

the image sensor further includes a second pixel circuit including—
- a second photodiode configured to photogenerate second signal charge based on second incident light,
- a second floating diffusion configured to receive the second signal charge from the second photodiode,
- a second LOFIC having (i) a third metal electrode selectively coupled to the second floating diffusion and (ii) a fourth metal electrode,
- a third reset transistor configured to selectively couple (a) the third metal electrode of the second LOFIC and the second floating diffusion to (b) the power source, based at least in part on the first reset control signal applied to a gate of the third reset transistor, and
- a fourth reset transistor configured to selectively couple the fourth metal electrode of the LOFIC to the power source based at least in part on the second reset control signal applied to a gate of the fourth reset transistor; and the switch is further configured to selectively couple the fourth metal electrode of the LOFIC to the bias voltage source.

* * * * *